No. 644,718. Patented Mar. 6, 1900.
W. H. MILLER.
VELOCIPEDE OR LIKE VEHICLE.
(Application filed Dec. 12, 1899.)
(No Model.)
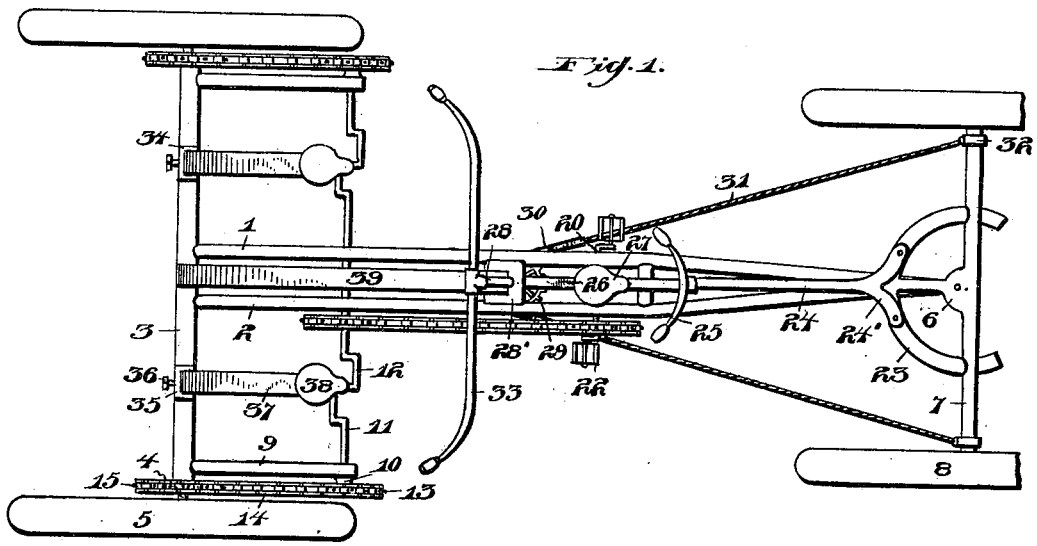
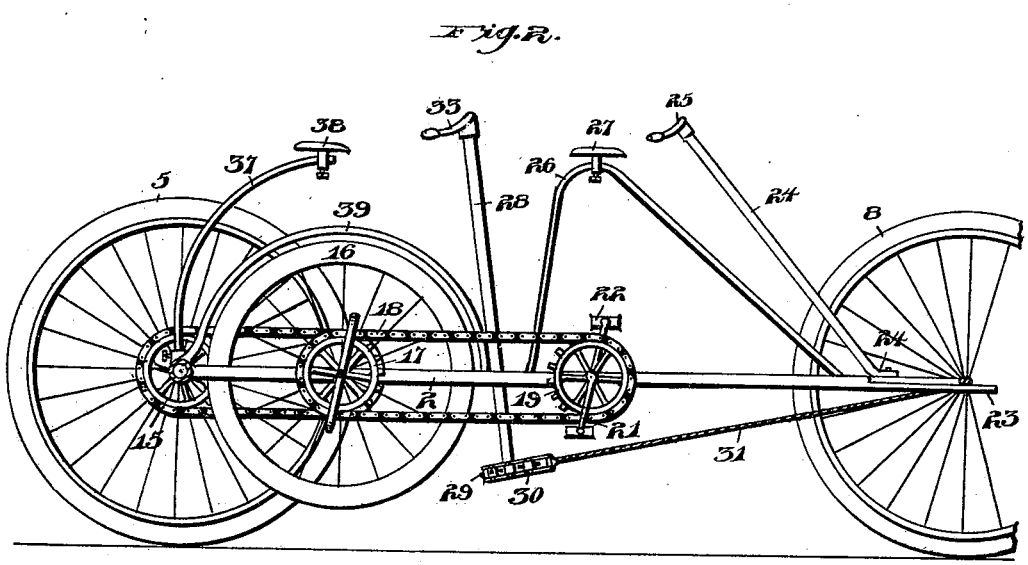
WITNESSES:
INVENTOR
W. H. Miller.
BY
ATTORNEYS.

UNITED STATES PATENT OFFICE.

WILLIAM H. MILLER, OF CANTON, OHIO.

VELOCIPEDE OR LIKE VEHICLE.

SPECIFICATION forming part of Letters Patent No. 644,718, dated March 6, 1900.

Application filed December 12, 1899. Serial No. 740,081. (No model.)

*To all whom it may concern:*

Be it known that I, WILLIAM H. MILLER, a citizen of the United States of America, residing at Canton, in the county of Stark and State of Ohio, have invented certain new and useful Improvements in Velocipedes or Like Vehicles, of which the following is a specification, reference being had therein to the accompanying drawings.

My invention relates to certain new and useful improvements in velocipedes and vehicles of this class having more than two wheels and one seat.

The object of the invention is to provide an improved velocipede extremely strong, simple in construction, and wherein the operating mechanism is so constructed and arranged that great propelling power is obtained, and hence a high rate of speed can be attained and the machine easily propelled up hill and upon rough country roads. This object can be accomplished by the novel combination and arrangement of parts to be hereinafter more specifically described, and particularly pointed out in the claim.

In describing the invention in detail reference is had to the accompanying drawings, forming a part of this specification, and wherein like numerals of reference indicate corresponding parts throughout both views, in which—

Figure 1 is a top plan view of my improved velocipede. Fig. 2 is a cross-sectional view thereof.

Referring to the drawings by reference-numerals, 1 and 2 indicate a pair of horizontal supporting-rods connected at their rear end to a transversely-extending elongated sleeve 3, in which is journaled the rear axle 4, carrying the rear wheels 5, and the forward portion of these horizontally-extending supporting-rods 1 and 2 converge together and are pivotally connected to the apertured supporting-lugs 6, formed integral with the front axle 7, carrying the front wheels 8.

The sleeve 3 is provided near each end with a horizontal extension 9, each of which has a bearing 10 formed integral with one side thereof, and also provided with an opening registering with the said bearing, through which operates the ends of the transversely-extending crank-rod 11, provided with a series of foot-treads 12, arranged in pairs. The crank-rod 11 is revolubly supported by the opening in the extension 9 and the bearing 10, and the ends thereof have mounted thereon a sprocket-wheel 13, which is connected by means of the chain 14 to a sprocket-wheel 15, mounted on the rear axle 4. The crank-rod 11 has also mounted thereon between the braces 1 and 2 a weighted fly-wheel 16, and at the side of the brace 2 a sprocket-wheel 17, which is connected by means of a chain 18 to a sprocket-wheel 19, mounted on one end of the pedal-shaft 20, journaled in the braces 1 and 2 about the center thereof. The pedal-shaft 20 has a crank 21 connected to each end thereof, and is provided with the ordinary pedals 22.

Connected to the front axle 7 and to the apertured lugs 6 is a circular bar 23, to which the upwardly-extending front steering-rod 24 is secured, as at 24'. This rod 24 is provided with a suitable handle-bar 25, and the rod is arranged near the front end of the braces 1 and 2, adjacent to the curved support 26 for the front seat 27, suitably connected thereto, the support 26 being secured to the braces 1 and 2 in any desirable manner.

Arranged at the front of the fly-wheel 16 is the rear steering-rod 28, which extends above and below the braces 1 and 2 and is suitably supported thereby by the plate 28'. This rear steering-rod 28 has connected to its lower end a sprocket-wheel 29, upon which operates a chain 30, having each end thereof secured to one end of a cord or cable 31, while the opposite end of this cord or cable is connected to the front axle 7 by means of collars 32 mounted thereon. The upper end of the rear steering-rod 28 is provided with a suitable handle-bar 33.

34 35 indicate a pair of collars mounted on the elongated sleeve 3 and held in position by set-screws 36. These collars 34 35 are each adapted to support the upwardly-extending curved support 37 for the rear seats 38.

39 indicates a guard connected to the sleeve 3 and to the plate 28', and is arranged over the weighted fly-wheel, as shown.

It is thought that the operation of my improved velocipede can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

In a velocipede of the character described, the combination of a pair of supporting-braces, a sleeve connected to the rear end thereof, an axle journaled in said sleeve having a wheel connected to each end thereof, a pair of extensions formed integral with said sleeve, a crank-rod mounted in the said extensions, a sprocket-wheel mounted on each end of the said rod, a sprocket-wheel mounted to each end of the said axle, means for connecting the said sprocket-wheels together, a short shaft mounted in the said braces and provided at each end with a suitable pedal-crank, a sprocket-wheel mounted on one end thereof, a sprocket-wheel mounted on the said crank-rod, a chain connecting the two last-named sprocket-wheels together, a series of seats suitably supported upon the said braces, a front axle pivotally connected to the said braces having a wheel secured to each end thereof, a front steering-rod suitably connected to the said axle, a rear steering-rod suitably supported in said braces, a sprocket-wheel connected to the lower end of said rod, and means for connecting the said sprocket-wheel to the front axle, substantially as set forth.

In testimony whereof I affix my signature in the presence of two witnesses.

WILLIAM H. MILLER.

Witnesses:
JOSEPH QUINN,
JOSEPH A. WIELANDT.